April 22, 1930.  S. WILLIAMS  1,755,464
VALVE FOR PNEUMATIC CONVEYERS
Filed Oct. 29, 1927
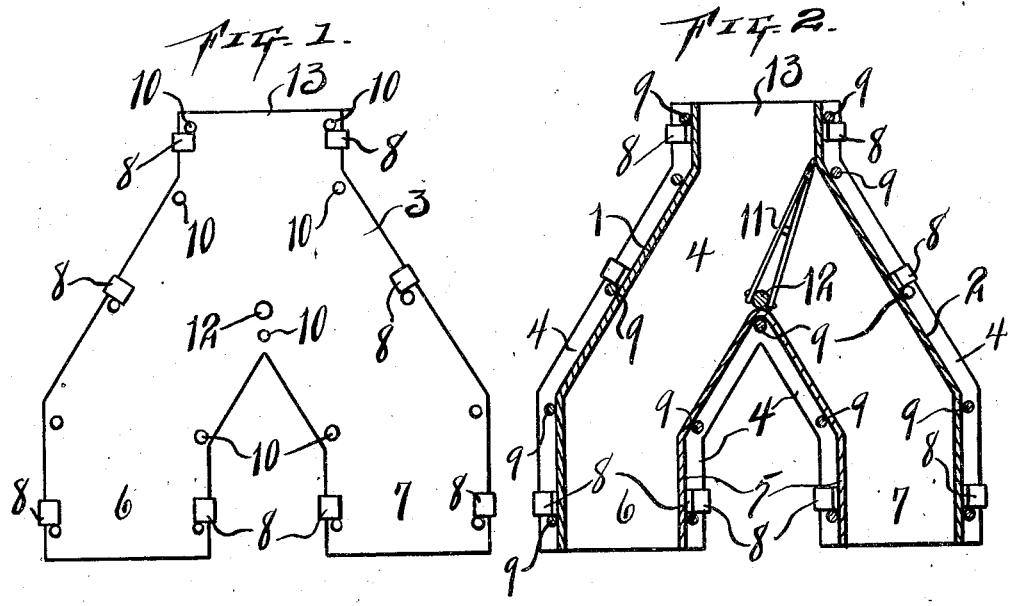
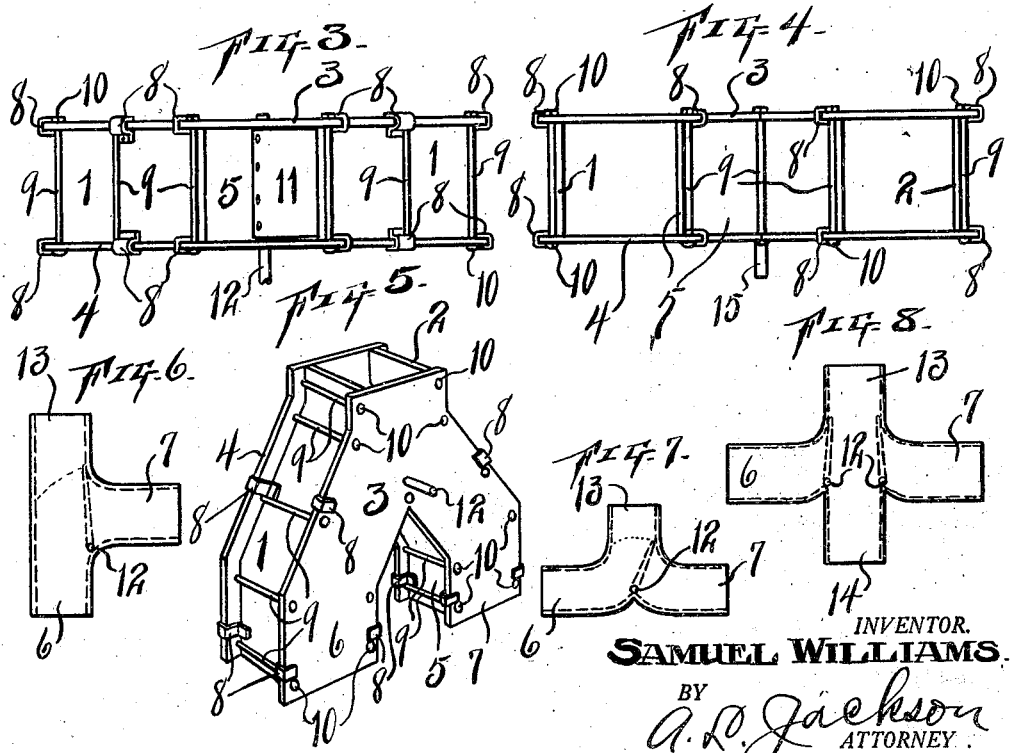
INVENTOR.
SAMUEL WILLIAMS.
BY
A. D. Jackson
ATTORNEY.

Patented Apr. 22, 1930

1,755,464

UNITED STATES PATENT OFFICE

SAMUEL WILLIAMS, OF ELK CITY, OKLAHOMA

VALVE FOR PNEUMATIC CONVEYERS

Application filed October 29, 1927. Serial No. 229,704.

My invention relates to valves and more particularly to valves in pneumatic distribution systems; and the object is to provide valves for use in handling different kinds of fibrous material, such as seed cotton, wool, saw dust, shavings and the like, and to provide valves which are constructed of parts which are readily detachable so that worn parts can be removed and new substitutes can be easily and quickly installed in the valve without disturbing other parts of the valve and to provide valves of any required strength so that the valves are capable of universal application. Another advantage is that material can be driven in opposite directions, that is, material may be driven in any one or more of the three directions shown in the drawings with equal facility. Other objects and advantages will be fully explained in the following description and the invention will be more particularly pointed out in the claims.

Reference is had to the accompanying drawings which form a part of this application.

Fig. 1 is a plan view of the valve.

Fig. 2 is a horizontal section of the same.

Fig. 3 is an end view of the upper end of Fig. 1.

Fig. 4 is an end view of the bottom end of Fig. 1.

Fig. 5 is a perspective view of the valve.

Figs. 6, 7, and 8 illustrate different forms of the distributing branches of the valve.

Similar characters of reference are used to indicate the same parts throughout the several views.

The valve herein shown has three ports which may be inlet or outlet ports according to the use to be made of the valve. The valve casing is constructed of sheet metal comprising side walls 1 and 2 and top wall 3 and bottom wall 4. The side walls are interchangeable and the top and bottom walls are interchangeable. The valve has branches 6 and 7 and the inner faces of the branches are closed by a single sheet of metal 5 which is bent as shown in Fig. 2. The sides 1 and 2 are arranged or set edgewise at right angles to the top 3 and bottom 4, as shown. Lugs or keepers 8 are welded to the side members 1 and 2 and to the member 5. These lugs or keepers 8 are then bent against the walls 3 and 4. This will hold the sides against inward movement. The top 3 and the bottom 4 are clamped on the sides 1 and 2 by bolts or rods 9 and nuts 10. The rods 9 project through both the top and the bottom and lie against the sides 1 and 2 and against the member 5 and nuts 10 are screwed on the bolts or rods 9 to clamp the top and bottom members 3 and 4 on the side members 1 and 2 and 5. The top 3 and bottom 4 are held against movement towards each other by the side members 1 and 2 and 5 and the side members are doubly locked against movement relative to each other, that is, they are locked against inward movement by the lugs 8 and locked against outward movement by the rods or bolts 9. The top and bottom members are locked against outward movement by the heads of the bolts 9 and by the nuts 10. The valve gate 11 is pivotally mounted on a pivot bolt or rod 12. The gate 11 can be set to direct material through outlet 6, or 7, or 13 as may be required.

The branches 6 and 7 may be made in different shapes or forms and set at different angles for adapting the same for special locations of machinery. More branches may be used if necessary, as branch 14 of Fig. 8.

What I claim, is:—

1. A valve for pneumatic conveyers comprising a casing consisting of detachable top and bottom members and side members and having branch members and a single piece side member for the interior sides of said branch members, lugs attached to said side members and bent on the edges of said top and bottom to hold said side members against inward movement and for spacing said top and bottom members apart, means for clamping said top and bottom members on said side members and for locking said side members against outward movement, said valve having a plurality of openings to be selectively used, and a gate valve pivotally mounted at the juncture of said branch members for directing material through the selected openings.

2. A valve for pneumatic conveyers comprising a casing consisting of detachable top and bottom members and side members, lugs rigid with said side members and hooked on the edges of said top and bottom members to lock said side members against inward movement, bolts projected through the edges of said top and bottom members and bearing against said side members for locking said side members against outward movement, nuts engaging said bolts for clamping said top and bottom members on said side members, said valve having a plurality of openings to be selectively used, and a gate valve for directing material through the selected openings.

In testimony whereof, I set my hand, this 20th day of October, 1927.

SAMUEL WILLIAMS.